(12) United States Patent
Gourlay

(10) Patent No.: US 9,010,983 B2
(45) Date of Patent: Apr. 21, 2015

(54) LIGHT GUIDE DEVICE

(76) Inventor: James Gourlay, West Lothian (GB)

( * ) Notice: Subject to any disclaimer, the term of this patent is extended or adjusted under 35 U.S.C. 154(b) by 0 days.

(21) Appl. No.: 13/698,703

(22) PCT Filed: May 24, 2011

(86) PCT No.: PCT/GB2011/050980
§ 371 (c)(1),
(2), (4) Date: Dec. 11, 2012

(87) PCT Pub. No.: WO2011/148171
PCT Pub. Date: Dec. 1, 2011

(65) Prior Publication Data
US 2013/0201723 A1    Aug. 8, 2013

(30) Foreign Application Priority Data

May 24, 2010   (GB) .................................. 1008599.1

(51) Int. Cl.
*F21V 8/00*        (2006.01)
*F21V 17/04*       (2006.01)

(52) U.S. Cl.
CPC ............ *G02B 6/0033* (2013.01); *G02B 6/0036* (2013.01); *G02B 6/0055* (2013.01); *G02B 6/0061* (2013.01); *F21V 17/04* (2013.01)

(58) Field of Classification Search
USPC .................. 362/617, 619, 620, 623, 625, 626
See application file for complete search history.

(56) References Cited

U.S. PATENT DOCUMENTS

| | | | |
|---|---|---|---|
| 6,874,925 B2 | 4/2005 | Page et al. | |
| 7,085,056 B2 * | 8/2006 | Chen et al. | 359/566 |
| 7,192,175 B2 * | 3/2007 | Parikka et al. | 362/606 |
| 7,207,708 B2 * | 4/2007 | Tanaka et al. | 362/619 |
| 7,401,966 B2 * | 7/2008 | Liao | 362/623 |
| 7,537,373 B2 * | 5/2009 | Liao | 362/619 |
| 7,976,207 B2 * | 7/2011 | Kim et al. | 362/600 |
| 2004/0114346 A1 | 6/2004 | Parker et al. | |
| 2008/0266876 A1 | 10/2008 | Chang | |
| 2009/0322986 A1 | 12/2009 | Wei et al. | |

(Continued)

FOREIGN PATENT DOCUMENTS

| | | |
|---|---|---|
| CN | 1952701 | 4/2007 |
| CN | 101295034 | 10/2008 |

(Continued)

OTHER PUBLICATIONS

International Search Report for PCT/GB2011/050980, mailed Dec. 28, 2011.

(Continued)

*Primary Examiner* — Laura Tso
(74) *Attorney, Agent, or Firm* — Nixon & Vanderhye, P.C.

(57) ABSTRACT

A light guide device for illumination, lighting and display purposes that exhibits an output light having a predetermined, and preferably uniform, angular luminance profile is described. The device comprises a light guide (13) suitable for guiding light coupled thereto and a plurality of extraction features (10, 11) located on one or more surfaces of the light guide. The plurality of extraction features comprises an interleaved pattern of first (11) and second extraction features the arrangement of which provides a means for defining the predetermined angular and spatial luminance profiles for the output light. The device allows for a uniform angular luminance profile to be produced that is maintained even when the light guide is curved or bent.

21 Claims, 10 Drawing Sheets

(56) References Cited

U.S. PATENT DOCUMENTS

2010/0295762 A1* 11/2010 Yeom et al. .................. 345/87
2011/0051460 A1   3/2011 Montgomery et al.
2012/0243259 A1*  9/2012 Zhou et al. .................. 362/613

FOREIGN PATENT DOCUMENTS

| WO | 03/008860   | 1/2003  |
|----|-------------|---------|
| WO | 2005101070  | 10/2005 |
| WO | 2009073470  | 6/2009  |
| WO | 2009141663  | 11/2009 |
| WO | 2011019785  | 2/2011  |

OTHER PUBLICATIONS

Written Opinion of the International Searching Authority for PCT/GB2011/050980, mailed Dec. 28, 2011.
Thorns, Peter, EN12464-1:2011 Light and Lighting—Lighting of Workplaces, Feb. 14, 2010, ZLD.
International Search Report issued in PCT/GB2011/050980 on Dec. 12, 2011.

* cited by examiner

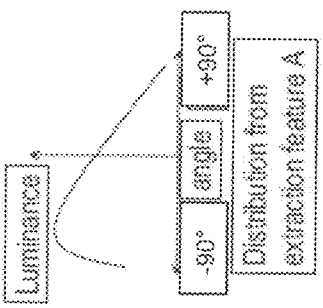
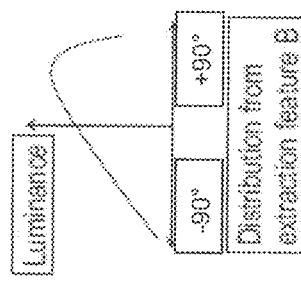
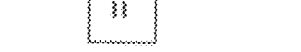
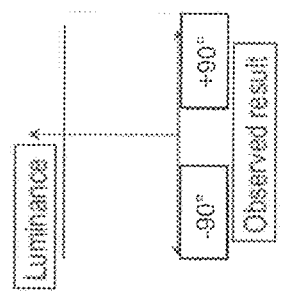
*Fig. 5(a)* *Fig. 5(b)* *Fig. 5(c)*

LIGHT GUIDE DEVICE

This application is the U.S. national phase of International Application No. PCT/GB2011/050980 filed 24 May 2011 which designated the U.S. and claims priority to GB Patent Application No. 1008599.1 filed 24 May 2010, the entire contents of each of which are hereby incorporated by reference.

The present invention relates to a light guide device for illumination, lighting and display purposes and, particularly, to a light guide device that exhibits an output light having a predetermined, and preferably uniform, angular luminance profile.

A number of light-guide devices are known to those skilled in the art. These devices are employed for a range of functions including illumination, backlighting, signage and display purposes. For example, it is known in the art to employ fibre optic lighting technology to produce flat, bendable lighting panels for LCD backlighting. In such devices a plastic or glass optical fibre employed to guide the light is woven into a flat, bendable lighting panel, see for example U.S. Pat. No. 6,874,925. Such devices however have a light output that exhibits low angular uniformity particularly when the panel is curved or bent.

Alternatively, it is known to employ flat or wedged shaped transparent panels for backlighting illumination, backlighting, signage and display purposes. Examples of such devices are provided by the inventors within PCT Publication No. WO 2005/101070 and presented schematically in FIG. 1, as generally represented by reference numeral 1. Here a light source 2 is edge-coupled into a planar light guide 3. The light 4 generated by the light source 2 then propagates within the planar light-guide 3 due to the effects of total internal reflection. Extraction features 5 e.g. bumps, indents, grooves, ink dots or lines on the surface of the planar light guide 3 then enable the light 4 to escape the total internal reflection condition.

There are two main physical principles employed by the extraction features 5 to disturb the total internal reflection, namely reflection and refraction. Reflection involves the light 4 interacting with a reflecting material on the surface of the light guide 3 which is absorbed and then re-emitted and so breaks down the effect of total internal reflection. A white material, for example, a white ink is commonly employed as the reflecting medium. The white ink emits the light in random directions (commonly called scattering) and as a result a proportion of the scattered light is incident on the opposing surface at an angle lower than the critical angle for the total internal reflection condition to apply and so the light can then exit the light guide 3 from this surface.

An alternative solution is to use refractive effects, where the shape of the exit surface is locally modified on small scale such that the effective angle of incidence of the guided light is changed below the critical angle and light can therefore exit in accordance with Snell's Law. Mechanical machining or laser machining of the surfaces of the light-guide 3 have been deployed to achieve this effect. Alternatively, it is known to injection mould, micro-mould or micro-emboss transparent hemispherical micro lens features, or uneven surfaced extraction features as described by the inventors within PCT Publication No WO 2009/141663, onto the light guide 3. Refraction techniques generally give more efficient and controllable interference with the guided light 4 than those employing reflection extraction features.

A common trait of all of the above described extraction features 5 is that they exhibit a low angular luminance uniformity which translates onto the light output from the devices 1. In order to provide an observer 6 with the appearance of uniform angular luminance it is known in the art to locate a diffuser 7 between the planar light guide 3 and the observer 6. A reflector 8, located on the opposite side of the planar light guide 3 to the observer 6, is also often employed to increase the light levels reaching the observer 6. Although the incorporation of the diffuser 7 and the reflector 8 can improve the angular uniformity of the output from a planar device e.g. to greater than 90%, the incorporation of the diffuser 7 and the reflector 8 not only add to the cost of the manufacture of the device 1 but also adds to its overall thickness.

Furthermore, it is found that the effectiveness of the diffuser 7 is significantly reduced when the planar light-guide 3 is bent or curved, as is desirable for certain applications. FIG. 2 presents a schematic representation of the situation where the light-guide device 1 of FIG. 1 is formed into the shape of a curve. As a result of the low angular uniformity of the light harnessed by the extraction features 5, the observer 6 looking at points A and B of the device 1 will see different luminance levels. Thus the output light levels of non-planar light-guide device 1 known in the art are found to vary significantly with viewing angle resulting in bright and dark areas as seen by the observer 6.

In PCT Publication No WO 2009/141663 the inventors describe a technique where the employment of extraction features 5 formed in arrays upon the light guide 3 provide a means for improving the spatial luminance uniformity of the output light i.e. the luminance as observed along the normal of different areas of the output surface of the light guide 3. However, the described apparatus still requires the incorporation of a diffuser 7 in order to compensate for variations in the angular luminance of the output light. In addition to the above, there exist industry standards regarding the control of the angle of light distribution for luminary requirements e.g. European Standard EN 12464-1: "The Lighting of Workplaces". There are various reasons for the existence of these standards, for example, lighting can cause interfering reflections on modern computer screens. For this reason the standard specifies requirements for controlling the average luminances. For normal workstations, a limit applies of 1000 cd/m$^2$ or 200 cd/m$^2$ depending on the computer screen. This limit applies for angles starting from 65° all-around. For critical computer screen activities this starts from 55° all-around.

It is therefore an object of an aspect of the present invention to obviate or at least mitigate the foregoing disadvantages of the light guide apparatus known in the art.

It is a further object of an aspect of the present invention to provide a light guide apparatus that allows for predetermined angular luminance profiles for the output light e.g. light guide apparatus that exhibit a light output of substantially uniform angular luminance.

A yet further object of an aspect of the present invention is to provide a non-planar light guide apparatus that exhibits a light output of substantially uniform angular luminance.

SUMMARY OF INVENTION

According to a first aspect of the present invention there is provided a light guide device the light guide device comprising a light guide suitable for guiding light coupled thereto and a plurality of extraction features located on a surface of the light guide and arranged to redirect a portion of the guided light so as to provide an output light wherein the plurality of extraction features comprises an interleaved pattern of first and second extraction features.

By providing an interleaved pattern of first and second extraction features predetermined angular luminance profiles for the output light can be produced.

The first extraction features preferably produce a first angular luminance profile component for the output light. The second extraction features preferably produce a second angular luminance profile component for the output light.

Most preferably the interleaved pattern of the first and second extraction features and hence the combination of the first and second angular luminance profiles provide the output light with a uniform angular luminance profile. Advantageously, the uniform angular luminance profile of the light-guide device is achieved without the need to employ a diffuser or a reflector. This provides a light guide device suitable for providing an output light of uniform angular luminance that has a reduced thickness and manufacturing costs when compared to those known in the art.

Preferably the light guide device further comprises one or more light sources arranged to couple light into the light guide.

Optionally the interleaved pattern comprises an array of elements made up of the first and second extraction features.

The array may comprise an array of irregularly spaced elements. Preferably the spacing between the elements of the array decreases the further the elements are located from the one or more light sources. In this way the extraction features provide a means for improving the spatial luminance uniformity of the output light of the device.

Alternatively the array comprises an array of regularly spaced elements. Preferably the area of the elements of the array increase the further the elements are located from the one or more light sources. In this way the extraction features provide a means for improving the spatial luminance uniformity of the output light of the device.

The array may comprise alternative rows or columns of the first and second extraction features. Alternatively the array comprises a chequered pattern of first and second extraction features.

In a yet alternative embodiment the interleaved pattern may comprise more than two types of extraction features.

It is preferable for the extraction features to be located on a common surface of the light guide. The extraction features may however be located on opposite surface of the light guide.

The extraction features may comprise a reflective extraction feature or a refractive extraction feature.

The light guide may be planar. Alternatively the light guide may be non-planar e.g. bent or curved.

According to a second aspect of the present invention there is provided a light guide device the light guide device comprising a non-planar light guide suitable for guiding light coupled thereto and a plurality of extraction features located on a surface of the light guide and arranged to redirect a portion of the guided light so as to provide an output light wherein the plurality of extraction features comprises an interleaved pattern of first and second extraction features.

By providing an interleaved pattern of first and second extraction features predetermined angular luminance profiles for the output light can be produced.

Embodiments of the second aspect of the invention may comprise features to implement the preferred or optional features of the first aspect of the invention or vice versa.

According to a third aspect of the present invention there is provided a method of producing a light guide device the method comprising the steps of:
 providing a light guide suitable for guiding light coupled thereto; and
 locating an interleaved pattern of first and second extraction features on a surface of the light guide so as to provide a means for forming an output light.

The step of locating the interleaved pattern may provide the output light with a uniform angular luminance profile.

The step of locating the interleaved pattern may comprise locating the first and second extraction features on a common surface of the light guide. The extraction features may however be located on opposite surface of the light guide.

The method may further comprise the step of coupling a light source to the light guide.

Embodiments of the third aspect of the invention may comprise features to implement the preferred or optional features of the first and second aspects of the invention or vice versa.

According to a fourth aspect of the present invention there is provided a method of producing a light guide device the method comprising the steps of:
 providing a non-planar light guide suitable for guiding light coupled thereto; and
 locating an interleaved pattern of first and second extraction features on a surface of the light guide so as to provide a means for forming an output light.

Embodiments of the fourth aspect of the invention may comprise features to implement the preferred or optional features of the first, second and third aspects of the invention or vice versa.

BRIEF DESCRIPTION OF DRAWINGS

Aspects and advantages of the present invention will become apparent upon reading the following detailed description and upon reference to the following drawings in which:

FIG. 5 presents luminance versus angle of observation graphs for:
 (a) the first extraction feature of the light guide device of FIG. 3;
 (b) the second extraction feature of the light guide device of FIG. 3; and
 (c) the combined output of the first and second extraction features of FIG. 3.

DETAILED DESCRIPTION

Figure 1:
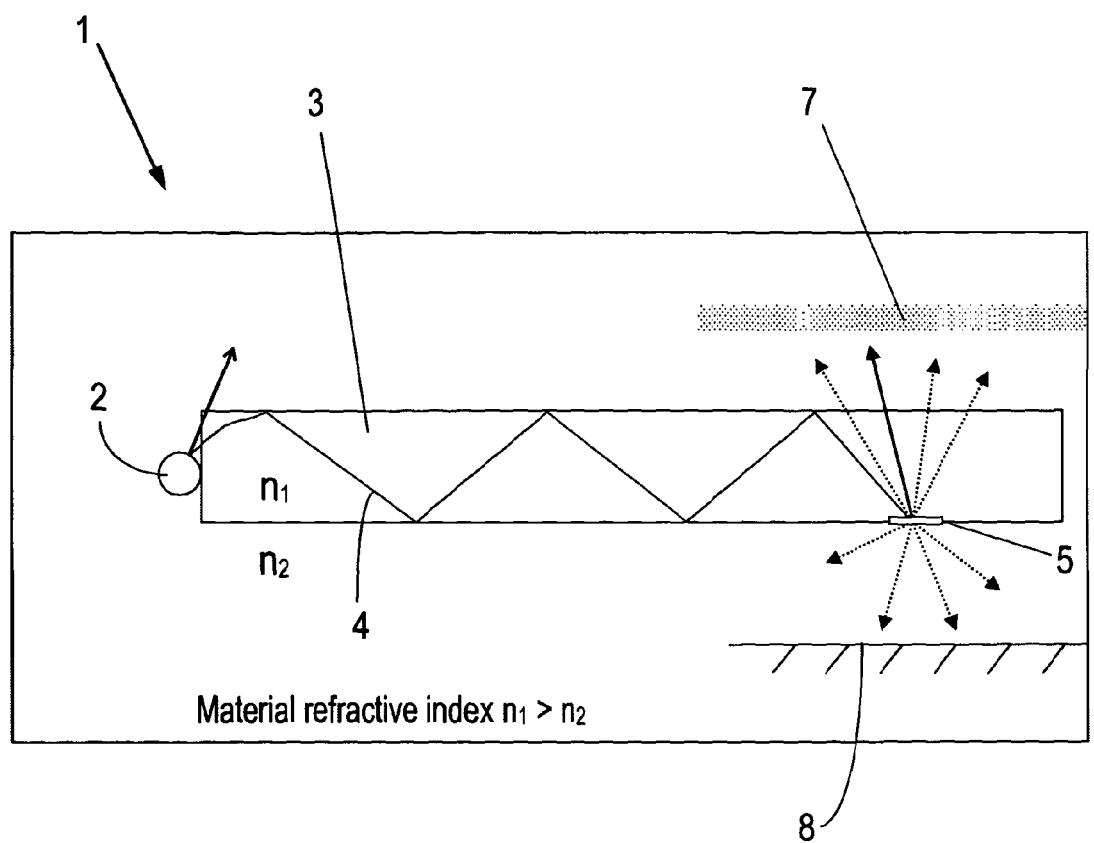
FIG. 1 presents a side view of a light guide device as known in the art.
Figure 2:
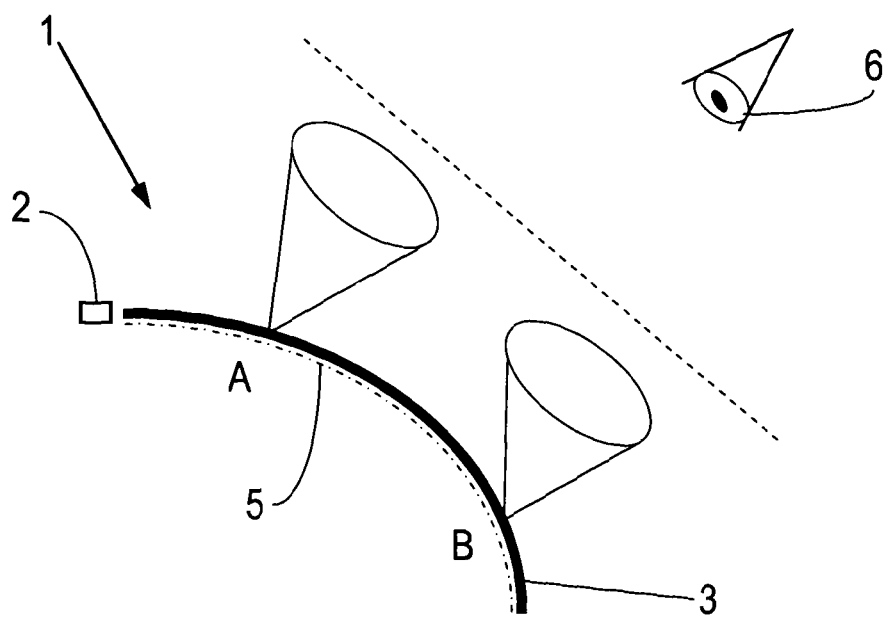
FIG. 2 presents a schematic representation of the light guide device FIG. 1 when bent or curved.
Figure 3A:
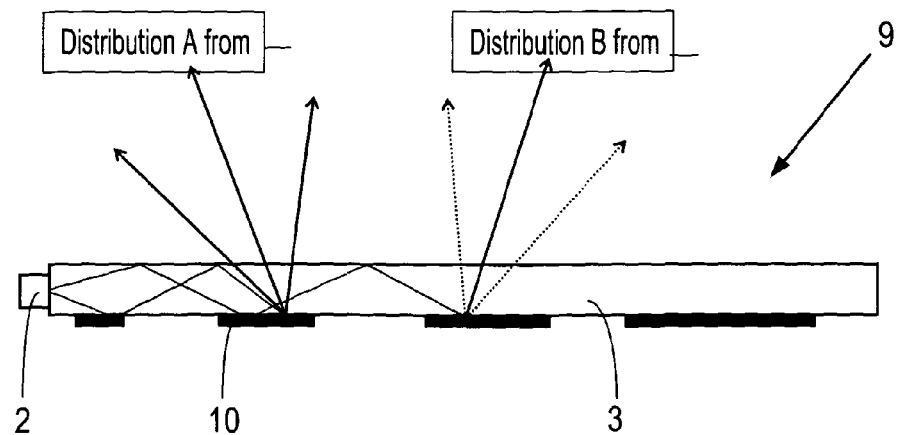
FIG. 3 presents:
 (a) a side view; and
 (b) a bottom view
of a light guide device in accordance with an aspect of the present invention.
Figure 3B:
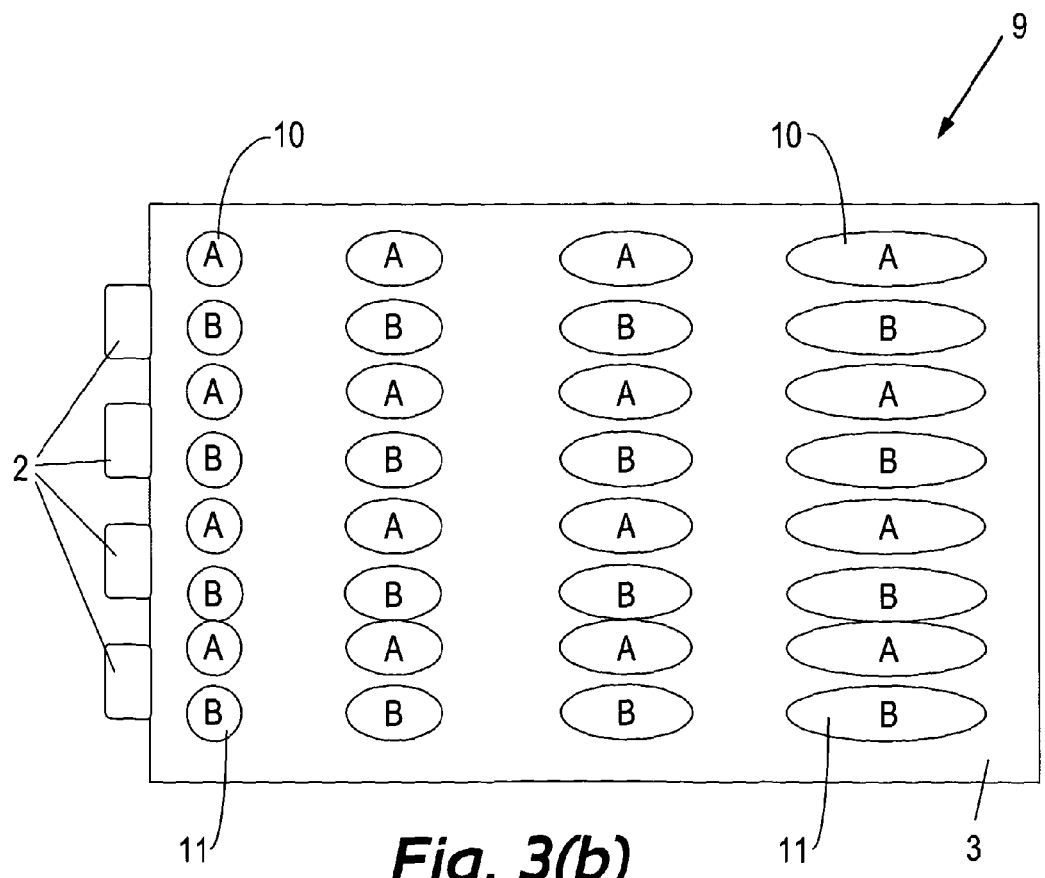

Referring to FIG. 3, a side view and bottom view of a light guide device 9 in accordance with an aspect of the present invention is presented. The light guide device 9 can be seen to comprise an array of light sources 2, in the form of LEDs, that is edge coupled to a planar light guide 3. Located across an outer surface of the planar light guide 3 are a plurality of first and second light extraction features 10 and 11. The first 10 and second light extraction features 11 are deployed across the surface of the planar light-guide 3 within an interleaved pattern.

FIG. 3(*b*) provides further detail of the interleaved pattern between the first 10 and second light extraction features 11. As can be seen the interleaved pattern comprises alternative rows of first 10 and second light extraction features 11. The surface area of the extraction features 10 and 11 can be seen to increases the further the extraction features are from the light source 2.

Figure 4:
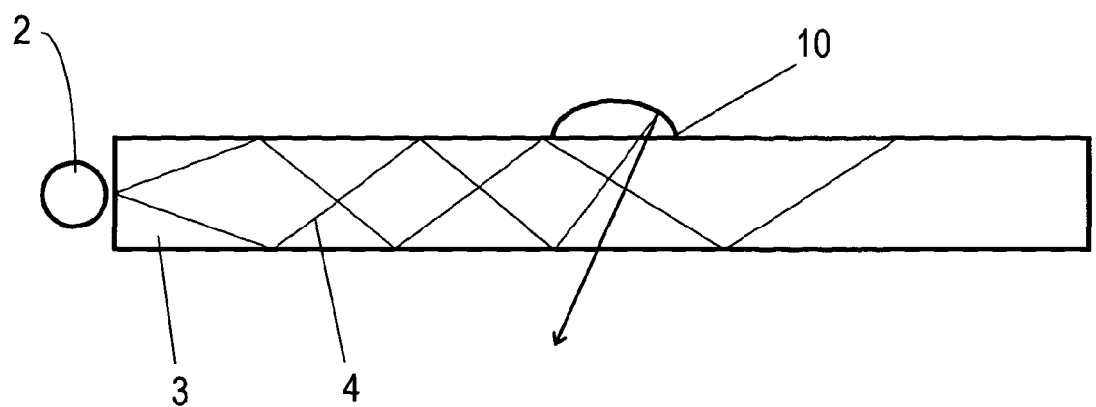
FIG. 4 presents a schematic representation of the interaction of a mirrored micro lens extraction feature with the light coupled within the light guide device of FIG. 3.

In the embodiment presented in FIG. 3 the first 10 and second light extraction features 11 are reflective extraction features and are located on a common surface of the planar light guide 3. In particular the first extraction features 10 comprise micro lenses coated with a reflective coating. Further detail of the interaction of these mirrored micro lenses with the light 4 coupled within the light guide 3 is presented schematically within FIG. 4. The second light extraction features 11 may comprises asymmetrical or symmetrical 3-d shapes forming, triangle or pyramid shapes, random micro lenses, v-grooves, cylinders as presented below within FIG. 8(*a*).

FIG. 5 presents three, luminance versus angle of observation graphs. The first of these graphs, presented in FIG. 5(*a*), shows the luminance versus angle of observation for the first extraction feature 10 of the light guide device 9. The luminance profile for the first extraction feature 10 is non-uniform. In particular, the luminance curve of FIG. 5(*a*) is seen to be asymmetric about the zero angle of observation with more light being extracted within the −90° to 0° range.

The second of these graphs, presented in FIG. 5(*b*), shows the luminance versus angle of observation for the second extraction feature 11 of the light guide device 9. Again the luminance profile in non-uniform but this time the luminance curve is seen to be asymmetric about the zero angle of observation with more light being extracted within the 0° to 90° range.

Since the first 10 and second light extraction features 11 are deployed across the surface of the planar light-guide 3 within an interleaved pattern they tend to compensate for each other such that the luminance versus angle of observation graphs for the light guide device 9 as a whole is substantially uniform, as presented in FIG. 5(*c*). As a result the light guide device 9 exhibits a light output of substantially uniform angular luminance.

By arranging for the surface area of the extraction features 10 and 11 to increase the further the extraction features 10 and 11 are from the light source 2 the extraction features 10 and 11 also provide a means for improving the spatial luminance uniformity of the output light of the device 9. Alternatively, improved uniformity of the spatial luminance of the output light of the device 9 can be achieved by arranging for the spacing between the extraction features 10 and 11 to decrease the further the extraction features 10 and 11 are located from the light source 2.

Figure 6:
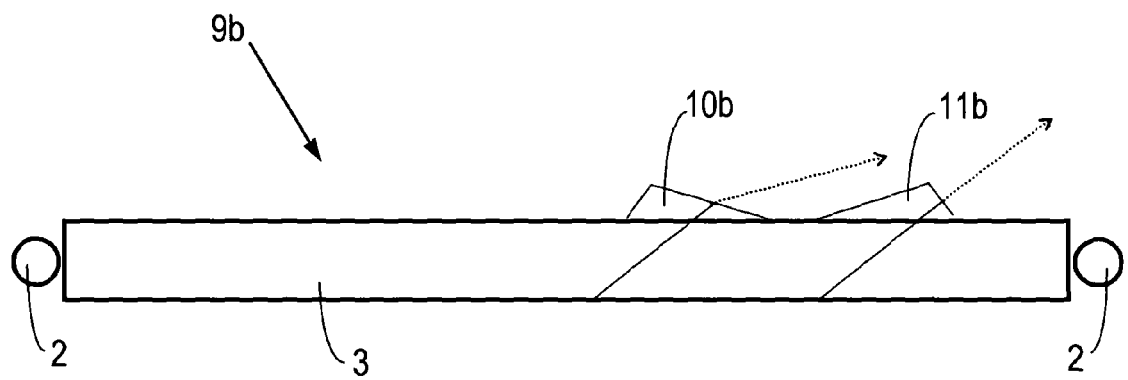
FIG. 6 presents an example of structures suitable for use as refractive extraction features, namely cylinders having asymmetric triangular shaped cross sections.

In an alternative embodiment of the light-guide device 9*b* the first 10*b* and second light extraction features 11*b* are both refractive extraction features and are again located on a common surface of the planar light-guide 3. FIG. 6 presents an example of such extraction features 10*b* and 11*b* in the form of cylinders having an asymmetric triangular shaped cross sections. It will be appreciated by those skilled in the art that in order to provide a uniform angular luminance profile with the extraction features 10*b* and 11*b* of FIG. 6 it is necessary to employ a light source 2 at either end of the light guide 3. As a result, light coupled from the right hand side of FIG. 6 provides the luminance versus angle of observation curve of FIG. 5(*a*) while the light coupled from the left provides the luminance versus angle of observation curve of FIG. 5(*b*). The overall effect is that an interleaved pattern of these refractive extraction features 10*b* and 11*b* provides a luminance versus angle of observation curve for the light-guide device 9*b* as presented in FIG. 5(*c*). As a result the light guide device 9*b* exhibits a light output of substantially uniform angular luminance.

In a similar manner to that described above an appropriate choice of surface area or spacing of the extraction features 10*b* and 11*b* can be employed to also provide the light guide device 9*b* with uniform spatial luminance.

Figure 7A:
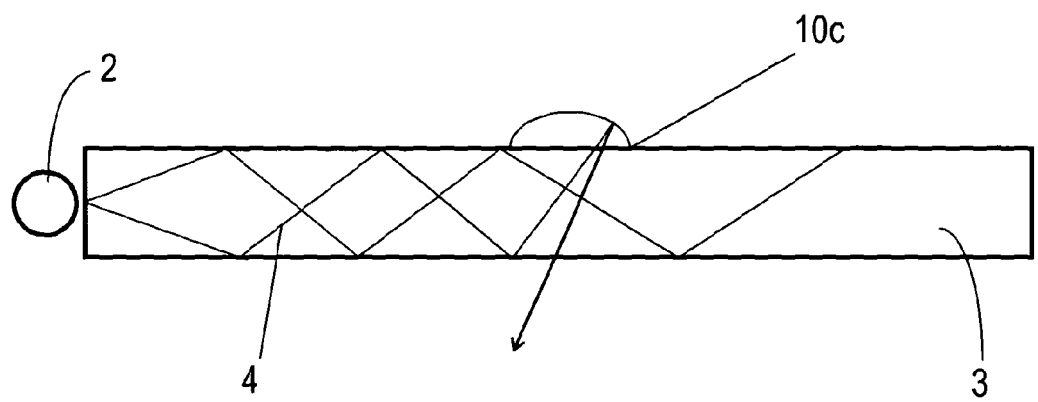
FIG. 7 presents a further alternative example of structures suitable for use as:
 (a) the first extraction feature of the light guide device of FIG. 3, namely a micro lens having a reflective coating; and
 (b) the second extraction feature of the light guide device of FIG. 3, namely a micro lens.
Figure 7B:
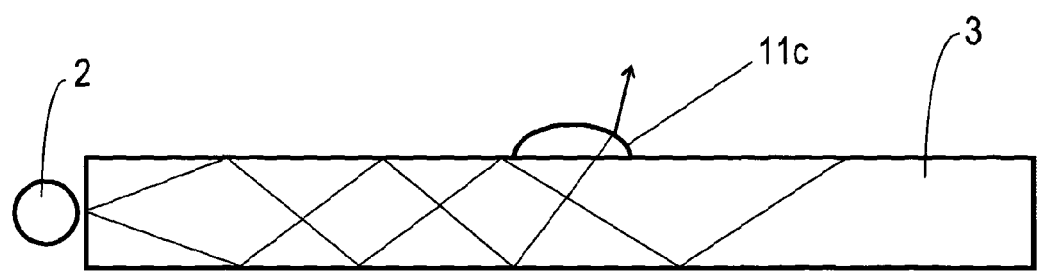

It will be appreciated by those skilled in the art that the first extraction features 10 may comprise reflective extraction features while the second light extraction features 11 may comprise refractive extraction feature, or vice versa. FIG. 7(*a*) presents one such suitable reflective extraction feature 10*c* which comprises a change in shape of the surface of the planar light-guide 3, in the form of a first transparent hemispherical micro lens having a reflecting coating. Such components provide a luminance versus angle of observation graphs of the type shown in FIG. 5(*a*). In a similar manner a second transparent hemispherical micro lens 11*c*, with no mirrored coating, is also employed to provide the second refractive extraction features. Such components provide a luminance versus angle of observation graph of the type shown in FIG. 5(*b*). In this embodiment it is necessary to incorporate a reflector 8 on the side of the planar light-guide 3 opposite to where the output light is to be viewed in order to provide the light-guide device 9*c* with a light output of substantially uniform luminance.

It will be appreciated that alternative interleaved patterns may be adopted. For example the interleaved pattern may comprise:

1) alternative columns of first 10 and second light extraction features 11;
2) the first 10 and second light extraction features 11 arranged as a chequered pattern;
3) less regular arrangements of the first 10 and second light extraction features 11 e.g. the extraction features may be grouped in two or more rows or columns, or randomly located within an array across the surface of the planar light-guide 3. In such embodiments the uniformity of the output light may be reduced.
4) more than two types of extraction features arranged in any of the patterns described in 1) to 3).

In all of the above described embodiments, except for those comprising solely reflective extraction features 5, the extraction features 5 may be located on opposite surfaces of the planar light-guide 3. This is a less preferable arrangement however since it is likely to make the device thicker and increase the manufacturing costs.

With the above arrangements it will be appreciated by those skilled in the art that the uniform nature of the output light from the light guide device 9 is not dependent upon the light guide being planar. Thus the light guide may now be curved or bent without significant deterioration of the uniform nature of the output light. Thus an observer will not see bright and dark areas as they change their viewing angle of the light guide device 9, even when it is non-planar. In practice high uniformity levels (>70%) for an observer have been achieved with the above described apparatus for light guide devices exhibiting large curvatures (bend radius>10 cm).

Figure 8A:
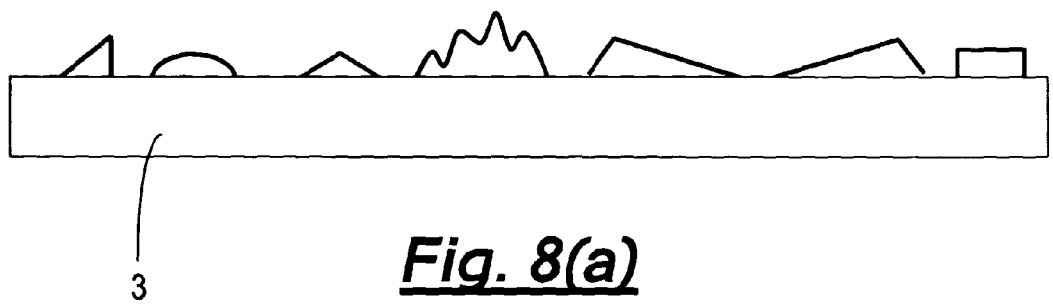
FIG. 8 side profiles of alternative surface features that may be employed as the extraction features within the light guide device.
Figure 8B:
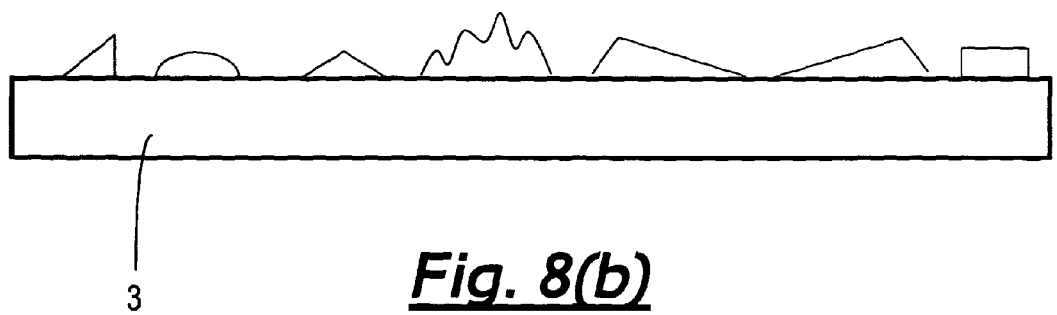
Figure 10A:
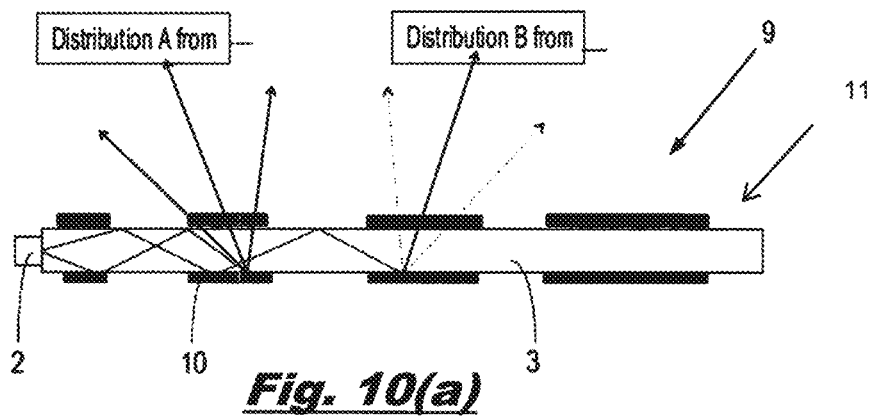
FIG. 10 presents:
(a) a side view; and
(b) a bottom view
of an alternative embodiment of the light guide device in accordance with an aspect of the present invention.
Figure 10B:
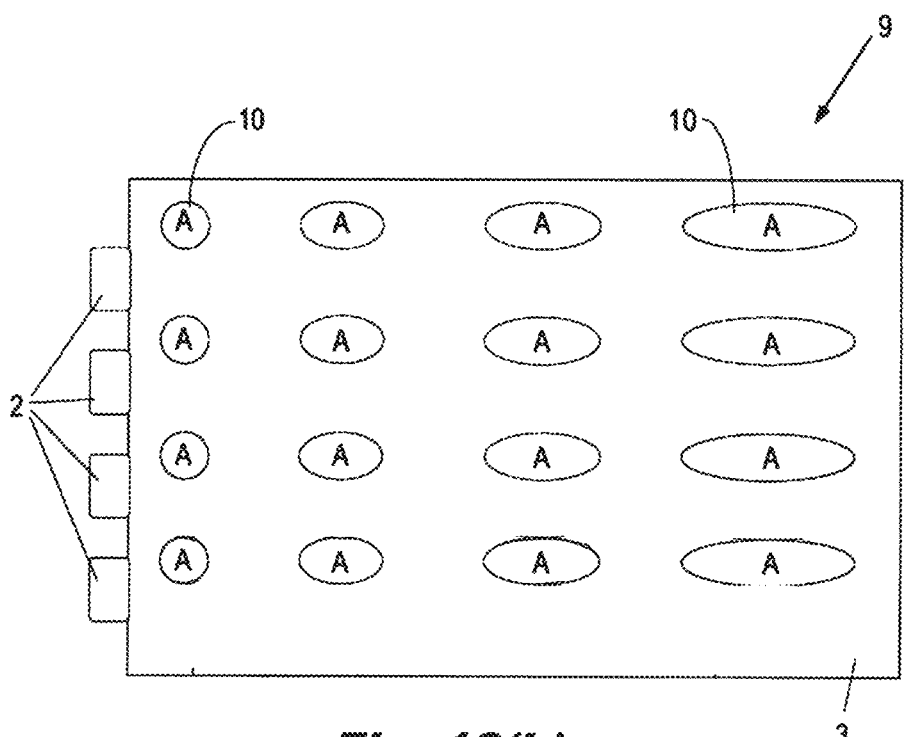

Alternative embodiments of the light guide device 9 may comprise the first 10 and second light extraction features 11 being located upon opposite surfaces of the planar light guide 3, as shown in FIG. 10. By way of example FIG. 8 presents alternative surface features that may be employed as the extraction features 10 and 11. The extraction features shown in FIG. 8(*a*) comprise a reflective coating and so are suitable for use as reflective extraction features while the extraction features shown in FIG. 8(*b*) do not comprise a reflective coating and so are suitable for use as refractive extraction features. As can be seen the surface features of FIG. 8 include asymmetrical or symmetrical 3-d shapes forming micro lenses, triangle or pyramid shapes, random micro lenses, v-grooves, cylinders.

Figure 9:
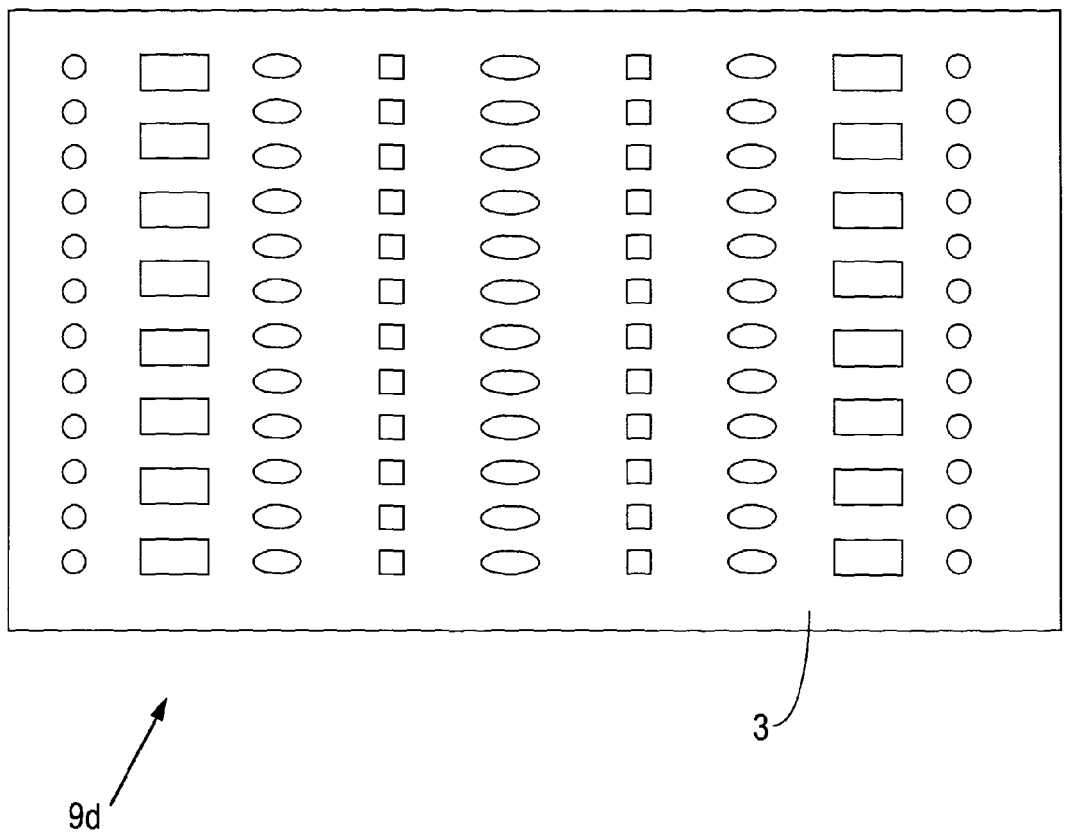
FIG. 9 shows a plan view of an alternative embodiment of light guide device.

The flexibility of the light guide device 9 is further demonstrated with reference to FIG. 9. In particular, FIG. 9 shows a plan view of a light guide device 9*d* comprising an interleaved pattern having two different types of extraction features. In this embodiment the light-guide device 9*d* is intended to be illuminated from either side of the light guide 3 therefore the extraction features exhibit different surface area densities so as to allow for a uniform spatial illumination profile, as well as a uniform angular luminance profile to be to be provided by the device.

The reflective coatings employed with the extraction features may be specular (mirror) or non-specular (white).

The light source 2 may comprise a single LED or multiple LEDs of the same or differing colours. The light sources can be located at one or more edges of the light guide. The light sources 2 can be embedded within the light guide 3 or located in apertures or ports formed in the light guide 3. The distribution of the light sources 2 within or across the light guide 3 can be a regular 2-d pattern such as hexagonal or square, or can vary in an irregular manner with the density of LEDs changing across the light guide. The light sources 2 can be edge-emitting, side emitting, or top emitting LED packages. The light sources 2 may be LED, super luminescent LED, micro cavity or laser diode chips. The light sources 2 may be fluorescent lamps.

The light guide 3 may be square, rectangular, circular or any other regular shape in cross section. Alternatively, the light guide 3 may have an irregular shaped cross-section. The size of the light guide 3 may vary from 1 cm to 2 m, with a thickness range from 0.1 mm to 10 mm.

The size (x,y,z) of the individual light extraction features 10 and 11 may be in the range of 1 micron to 1 cm. The light extraction features 10 and 11 may be a nanostructure with photonic bandgap, diffractive or non-linear optical prosperities.

Although the above described interleaved patterns of the first 10 and second extraction features 11 have been designed to produce an output for the device that is uniform it will be appreciated that alternative predetermine luminance profiles for the output light can be produced through the careful selection and deployment of the extraction features 10 and 11. Being able to control the angular distribution of "task" lighting and/or "decorative" lighting is important for example, to reduce glare, for interior roof lights within cars where it is desirable to direct the output light towards only the two front passengers, or within an office environment where it is desirable for the majority of the light to be directed towards desks in work area.

The present invention is inherent with significant advantages over the light guide devices known in the art. In the first instance a uniform light output can be achieved for a planar light guide device without the need to employ a diffuser or a reflector. This provides a light guide device suitable for having reduced thickness and manufacturing costs when compared to those known in the art.

In addition, the uniform nature of the output light from the light guide device is maintained even when the device is curved or bent i.e. non-planar. This significantly increases the potential application of the presently described light-guide devices e.g. as low cost, energy efficient, aesthetically pleasing lights, backlights for curved or flexible displays and signage, automotive and avionic interiors for display and lighting, lighting for medical products. These are all applications where the spatial luminance distribution and the angular distribution can be optimised for delivering light where required.

A light guide device for illumination, lighting and display purposes that exhibits an output light having a predetermined, and preferably uniform, angular luminance profile is described. The device comprises a light guide suitable for guiding light coupled thereto and a plurality of extraction features located on one or more surfaces of the light guide. The plurality of extraction features comprises an interleaved pattern of first and second extraction features the arrangement of which provides a means for defining the predetermined angular and spatial luminance profiles for the output light. The device allows for a uniform angular luminance profile to be produced that is maintained even when the light guide is curved or bent.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. A light guide device comprising a light guide suitable for guiding light coupled thereto and a plurality of extraction features located on one or more surfaces of the light guide and arranged to redirect a portion of the guided light so as to provide an output light wherein the plurality of extraction features comprises an interleaved pattern of first and second extraction features, the first extraction features producing a first angular luminance profile component for the output light, the second extraction features producing a second angular luminance profile component for the output light, and wherein the combination of the first and second angular luminance profiles provide the output light with a substantially uniform angular luminance profile.

2. A light guide device as claimed in claim 1 wherein the light guide device further comprises one or more light sources arranged to couple light into the light guide.

3. A light guide device as claimed in claim 1 wherein the interleaved pattern comprises an array of elements made up of the first and second extraction features.

4. A light guide device as claimed in claim 3 wherein the array comprises an array of irregularly spaced elements.

5. A light guide device as claimed in claim 3 wherein the spacing between the elements of the array decreases the further the elements are located from the one or more light sources.

6. A light guide device as claimed in claim 3 wherein the array comprises an array of regularly spaced elements.

7. A light guide device as claimed in claim 3 wherein the area of the elements of the array increase the further the elements are located from the one or more light sources.

8. A light guide device as claimed in claim 3 wherein the array comprises alternative rows or columns of the first and second extraction features.

9. A light guide device as claimed in claim 3 wherein the array comprises a chequered pattern of first and second extraction features.

10. A light guide device as claimed in claim 1 wherein the interleaved pattern comprises more than two types of extraction features.

11. A light guide device as claimed in claim 1 wherein the extraction features are located on a common surface of the light guide.

12. A light guide device as claimed in claim 1 wherein the extraction features are located on opposite surfaces of the light guide.

13. A light guide device as claimed in claim 1 wherein the extraction features comprise a reflective extraction feature or a refractive extraction feature.

14. A light guide device as claimed in claim 1 wherein the light guide is planar.

15. A light guide device as claimed in claim 1 wherein the light guide is non-planar.

16. A method of producing a light guide device the method comprising:
   providing a light guide suitable for guiding light coupled thereto;
   locating an interleaved pattern of first and second extraction features on or more surfaces of the light guide so as to provide a means for forming an output light from the light guide device;
   producing a first angular luminance profile component for the output light from the first extraction features;
   producing a second angular luminance profile component for the output light from the second extraction features; and
   combining the first and second angular luminance profiles to provide the output light with a substantially uniform angular luminance profile.

17. A method of producing a light guide device as claimed in claim 16 wherein the interleaved pattern is formed by locating the first and second extraction features on a common surface of the light guide.

18. A method of producing a light guide device as claimed in claim 16 wherein the interleaved pattern is formed by locating the first and second extraction features on opposite surfaces of the light guide.

19. A method of producing a light guide device as claimed in claim 16 wherein the method further comprise the step of coupling a light source to the light guide.

20. A light guide device comprising a light guide suitable for guiding light coupled thereto and a plurality of extraction features located on one or more surfaces of the light guide and arranged to redirect a portion of the guided light so as to provide an output light wherein the plurality of extraction features comprises an interleaved pattern of first and second extraction features, and wherein the extraction features are located on opposite surfaces of the light guide.

21. A method of producing a light guide device the method comprising:
   providing a light guide suitable for guiding light coupled thereto; and
   locating an interleaved pattern of first and second extraction features on surfaces of the light guide so as to provide a means for forming an output light, wherein the interleaved pattern is formed by locating the first and second extraction features on opposite surfaces of the light guide.

* * * * *